United States Patent
Colston et al.

[11] 3,725,723
[45] Apr. 3, 1973

[54] GRAPHIC DISPLAY SYSTEM
[75] Inventors: John Matthew Colston, Gravesend, England; James Robert Machin, Grand Prairie, Tex.
[73] Assignee: Elliott Brothers (London) Limited, London, England
[22] Filed: Sept. 25, 1970
[21] Appl. No.: 76,516

[52] U.S. Cl....................315/22, 315/18, 340/324 A
[51] Int. Cl................................................H01j 29/70
[58] Field of Search..............315/18, 22; 340/324 A

[56] References Cited

UNITED STATES PATENTS

| | | | |
|---|---|---|---|
| 3,549,939 | 12/1970 | Smitzer | 340/324 A |
| 3,594,608 | 1/1971 | Mutton | 340/324 A |
| 3,611,348 | 10/1971 | Rogers | 340/324 A |
| 3,598,911 | 8/1971 | Helbig | 340/324 A |

*Primary Examiner*—Reuben Epstein
*Attorney*—Misegades & Douglas

[57] ABSTRACT

Display systems of the CRT type are known which operate in various modes. One mode is a TV type mode; another is a DDA (digital differential analyzer) type mode, in which two digital registers (X and Y registers) control the spot displacement, being incremented at constant high speed by increments $dx$ and $dy$, where $dx^2 + dy^2$ is a small constant. If $dx$ and $dy$ are constant, this draws a straight line, whose slope, $\tan \theta$, is $dy/dx$.

By the invention, the DDA-type mode circuits can also be operated during system operation in the TV-type mode, with $dy$ equal to the line spacing and $dx$ equal to $\tan \theta$ times the line spacing. The X register alone is used, and incremented on each line scan. Its contents are compared with the line scan waveform, and a pulse produced on equality. If this pulse is fed directly to the video circuits, this produces a line on the screen superposed on whatever other information is being displaced. The pulse may instead be used to change the state of a flip-flop whose output is fed to the video circuitry; this results in brightening an area on the screen bounded by the line which the pulses would produce directly. This may be used as a horizon indicator for an aircraft pilot's display system, distinguishing the horizon from any other linear information which may be displayed at the same time.

9 Claims, 1 Drawing Figure

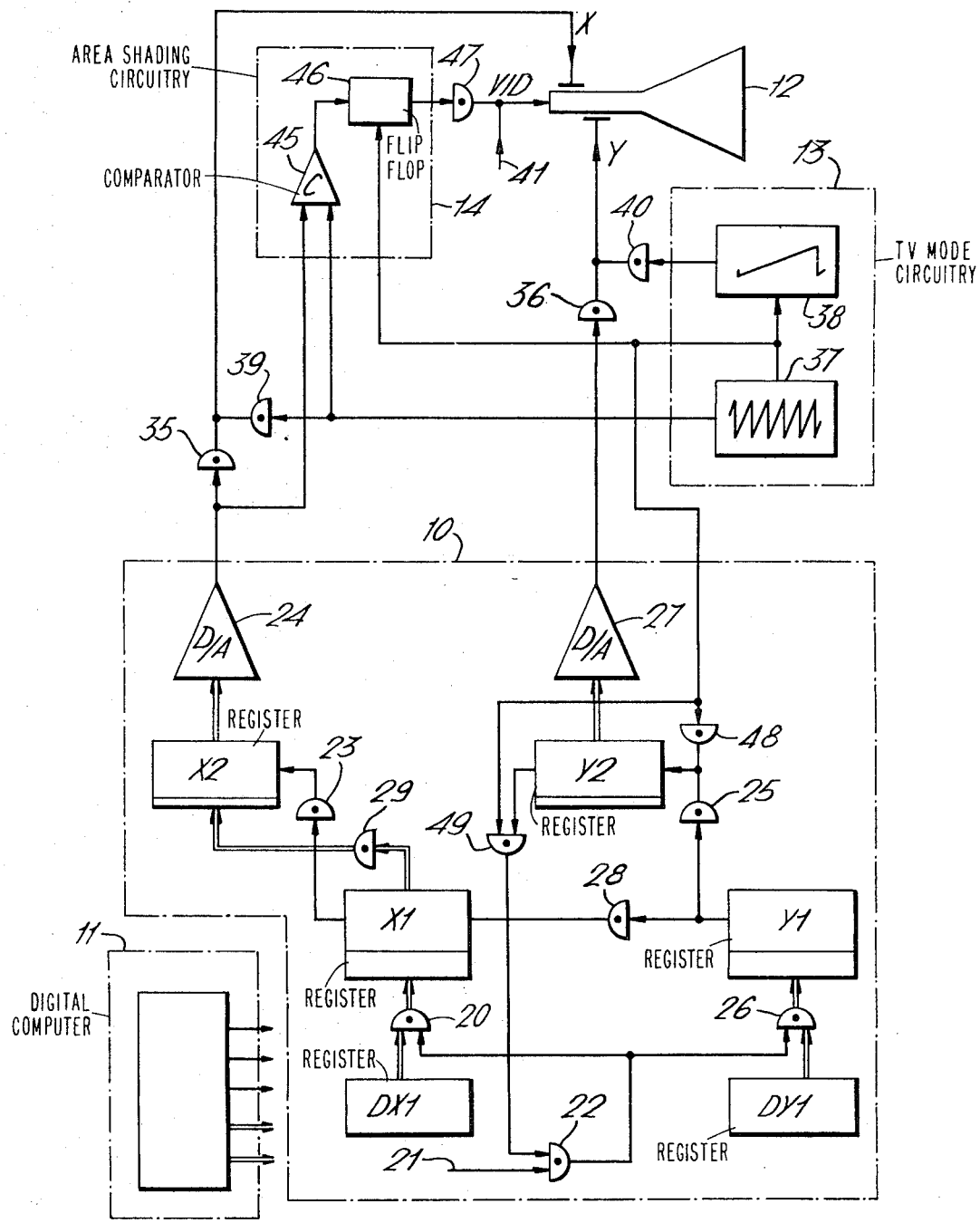

GRAPHIC DISPLAY SYSTEM

The present invention relates to display systems of the CRT type capable of operating in two different modes, viz a TV mode in which the display screen is scanned by a TV raster and a digital stroke writing mode in which a DDA (digital differential analyzer) type of technique is used. Display systems of the CRT type may use a conventional CRT or any suitable solid state matrix display device capable of producing a display equivalent to that produced by a conventional CRT.

In certain applications, e.g., in aircraft, a display system is used to display a variety of different types of information, the system operating in a different mode for each type of information. For example, for displaying cursive or symbolic information the spot may be moved at constant speed along the lines to be displayed, by a DDA type of technique. For displaying radar scans, a radial or PPI scan may be used. For pictorial information, a standard TV type scan may be used.

More specifically, in the DDA type of scan, two digital registers (X and Y registers) are used, one for the X displacement and one for the Y displacement, each feeding a respective digital-to-analog converter. The X and Y registers are each constructed as adders, and have increments $dx$ and $dy$ respectively added into them at regular intervals, so that their contents define a succession of points forming the line to be displayed. The increments $dx$ and $dy$ are chosen so that 1. $dy/dx = \tan \theta$, where $\theta$ is the angle which the tangent of the curve makes with the horizontal, and
2. $dx^2 = dy^2 = k$, some small constant.

The value of $k$ is chosen so that the points produced on the CRT screen are sufficiently close together to present the appearance of a continuous line, and the constant value of $k$ results in the line density being constant. Conditions (1) and (2) cannot, of course, be satisfied with complete precision in a digital system, but sufficient digit positions are used for them to be satisfied with good accuracy. This normally means that the X and Y registers have many more digital positions than need to be decoded, only those positions at the more significant end being decoded. The increments $dx$ and $dy$ will never be very large, and can be stored in further registers which only contain digital positions for the less significant end of the X and Y registers. For drawing a straight line, the values of $dx$ and $dy$ will be constant, and can be left unchanged while the line is being drawn. The start of the line can be defined by the initial values set into the X and Y registers, and the length of the line by the total number of increments added into them.

With multi-mode display systems of the type mentioned above, the various modes may be combined in various sequences. In particular, with a TV mode the time between frames (flyback time in a conventional CRT) may be used for generating line symbols in a DDA mode. The line symbols will thus appear superimposed on the TV picture. With this arrangement, the parameters of the TV mode are normally fixed by external considerations, such as compatibility with other systems. A typical example of such parameters is a frame repetition rate of 50 Hz, with each 20 ms being divided into 19 ms for actually performing the raster scan and 1 ms for flyback, etc. Thus there is 1 ms available for drawing line symbols in the DDA mode, and this is sufficient for many purposes, even though it is quite short.

We have now realized that the existing DDA circuits, which are normally used for drawing line symbols as described above, can also be used for generating line symbols when the system is operating in the TV mode for the addition of very little extra circuitry. Accordingly, a display system of the CRT type operable in a DDA mode in which line symbols are drawn by incrementing X and Y registers with increments $dx$ and $dy$, where $dx^2 + dy^2$ is a small constant, the registers controlling the spot position on the display screen, and also operable in a TV mode in which the spot scans the display screen with a repetitive raster, wherein the DDA circuits are operable during system operation in the TV mode with the $dy$ increment equal to the line spacing, and the X register being incremented in synchronism with the line scans and its output being compared with the line scan signals to control the brightness of the display.

One of the line symbols which it is particularly useful to generate is a "horizon" line, whose nominal position is horizontal across the center of the display screen; roll and pitch of the aircraft can then be indicated by tilting and vertical shifting of the horizon line. This line can conveniently be generated in the DDA mode. However, it is also desirable to emphasize and distinguish this line by shading the display screen so that it is bright above and dark below the horizon line, i.e., simultating an idealized bright sky and dark ground. This requires scanning a substantial proportion of the whole area of the display screen, and the time required to do this in the DDA mode would be quite excessive. Hence the invention is particularly useful in generating a shading over substantial areas of the screen. A (bistable) flip-flop is arranged to change state when the X register output is equal to the line scan waveform, and one output of the flip-flop is mixed into the video signal to display screen. Thus the desired shading is produced during the TV scan and is displayed at the same time as the normal picture produced during the TV scan. This can conveniently be combined with the generation of the horizon line itself by the normal DDA technique, during the DDA mode periods to TV scan frame flyback.

In many TV systems, an interlace system is used, and normally two interlaced frames are scanned during a single 20 ms period. If no information other than the area shading discussed above is being displayed, one of the two frames can be omitted. This will leave 11 ms (two flyback times plus one frame scan time) for operation in DDA or other modes, and the shaded area will still present a satisfactory appearance although it may be somewhat lined. The "lining" can be reduced by increasing the spot size.

An embodiment of the invention will now be described in detail, by way of example, with reference to the accompanying drawing, which is a simplified block diagram of a display system.

The system comprises five main units, viz DDA mode circuitry 10, a digital computer 11, a conventional CRT 12, TV mode circuitry 13, and area shading circuitry 14. The computer 11 supplies input data to the DDA mode circuitry 10 and also controls the overall timing of the system.

Considering first the DDA mode circuitry, the X register consists of two 10-bit registers X1 and X2 which are notionally combined as a single 20-bit register. The less significant (lower) half X1 of the X register is fed from a register DX1, which can be set to contain the X increment $dx$ from the computer 11, via a gate 20 which is enabled when the contents of the X register are to be incremented. The enabling signal is obtained from timing signals applied to line 21 when in the DDA mode, via an OR gate 22. The less significant half X1 of the X register is constructed as an accumulator, with full accumulator logic between the stages. The two halves X1 and X2 of the X register are connected by a "carry" line via a gate 23 which is enabled during the DDA mode, and the more significant (upper) half X2 is constructed as a counter. Conventional bidirectional accumulating and counting circuitry is used so that the increment $dx$ can be of either sign. The more significant half X2 of the X register feeds a digital-to-analog converter 24.

The Y register similarly consists of two 10-bit registers Y1 and Y2 connected by a "carry" line via a gate 25. Register DY1 contains the Y increment $dy$, and feeds register Y1 via a gate 26. Register Y2 feeds a digital-to-analog converter 27. (Gates 28 and 29 are disabled in the DDA mode).

The outputs of the digital-to-analog converters 24 and 27 are fed to the deflection system of the CRT 12 via gates 35 and 36, which are enabled during the DDA mode. Thus in this mode, the registers DX1 and DY1 have the increments $dx$ and $dy$ set in them initially from the computer 11, and the X and Y registers (normally only the more significant (upper) halves X2 and Y2) have the co-ordinates of the initial point of the line to be drawn similarly set in them. For a straight line, nothing more need be done than apply timing pulses on line 21, incrementing the contents of the X and Y registers repeatedly with the increments $dx$ and $dy$ in registers DX1 and DY1. For curved lines, the increments $dx$ and $dy$ must be changed as the line is drawn. This can be done by further suitably interconnected registers, using DDA type techniques, or by suitably programming the computer 11.

Considering now the TV mode circuitry 13, this consists essentially of line and frame waveform generators 37 and 38, of which the former produces timing pulses (line synch pulses) which control the latter. Their output waveforms are fed via gates 39 and 40 to the CRT deflection circuits; these gates 39 and 40 are enabled in the TV mode and disabled in the DDA mode, while the gates 35 and 36 are disabled in the TV mode. Video signals are fed to the control grid of the CRT over line 41 in the TV mode.

Consider now the operation of the system in the TV mode with area shading. For this, the Y increment $dy$ has a fixed value equal to the line spacing, and is not explicitly stored. The X increment $dx$ is now determined by the relation $dy/dx = \tan \theta$, and its range is therefore in principle infinite. In practice, its range is restricted to a 20-bit number, of which the less significant (bottom) 10 bits correspond to its full range in the DDA mode. The two registers DX 1 and DY1 are notionally combined to form a single 20-bit register which contains the 20-bit increment $dx$. The range of the increment $dx$ is thus the same as the range of the contents of the X register, and the whole of the X register must therefore be constructed as an adder. In the TV mode with area shading, therefore, the (20-bit) X register is formed by notionally combining registers X1 and Y1. Enabling of the gates 20 and 26 will thus result in the increment $dx$ being added into the X register; gate 28 is enabled to provide a carry connection between the two halves Y1 and X1 of the X register. (Registers X1 and DX1 form the more significant (upper) ends of the X and X increment registers).

The contents of the more significant half X1 of the X register have to be applied to the digital-to-analog converter 24. To achieve this, it is convenient to use register X2, which already feeds the converter 24. Register X2 therefore has the contents of register X1 continuously fed to it via gate 29, which is enabled in this mode; gate 23 is disabled in this mode.

The co-ordinate defined by the X register is therefore applied, in analog form, to the circuitry 14 together with the line waveform from the line waveform generator 37. In the circuitry 14, they are compared by a comparator 45 which produces an output signal when the two inputs to it are equal. This output signal is used to change the state of a (bistable) flip-flop 46, whose output if fed via a gate 47 (enabled in this mode) to the control grid of the CRT 12. The flip-flop 46 is also fed with the timing pulses (line synch pulses) from the line waveform generator 37, to reset it again at the beginning of each line.

As so far described, in the TV mode with area shading the X register is incremented in synchronism with the line scans and its output compared with the line scan waveform, setting flip-flop 46 and changing the brightness of the line scan accordingly. If the initial contents of the X register are at negative maximum and the increment $dx$ is positive, this generates a shaded area which starts at the top left-hand corner of the CRT screen (for a conventional system), at the beginning of the first line, the boundary sloping downwards to the right. For a boundary sloping the other way, the increment $dx$ must be negative, and it is convenient to start with the contents of the X register at positive maximum. Flip-flop 46 must be in one state at the beginning of each line for a boundary sloping one way, and the other state for a boundary sloping the other way. A circuit (not shown) is provided for controlling the initial state of flip-flop 46 in dependence on the sign of the increment $dx$.

Obviously, it is desirable for the shading to be able to start at points other than the top corners of the CRT screen. To achieve this, register Y2 (which is not otherwise used in this mode) is used. This register is initially set to contain the number of lines above the start of the shading boundary. The line synch pulses from the line waveform generator 37 are fed to it cause it to count down from its initial count to zero, gate 48 being enabled and gate 25 disabled in this mode. When it reaches the count of zero, it enables gate 49 and succeeding line synch pulses pass through this gate and the OR gate 22 to the gates 20 and 25, causing the increment $dx$ in registers DX1 and DY1 to be added to the contents of the X register X1 and Y1. (Line 21 is not energized in this mode). Thus the contents of the X register are not affected until the appropriate number of lines, as defined by the initial count in register Y2, have been scanned.

This still leaves the boundary of the shaded area starting at one or other end of a line scan. By setting an initial number in the X register, differing from the minimum or maximum contents by less than the increment $dx$, the effective starting point of the boundary can be adjusted to lie between two successive lines of the scan.

The conditions of operation of the flip-flop 46 can now be stated more exactly as follows. Assuming that the true state of this flip-flop corresponds to a bright line on the CRT, and that the display is to be bright at the top (corresponding to a light sky), the flip-flop must be set true at the beginning of the frame scan. It must also be held true for as long as the count in register Y2 is above zero; this can conveniently be achieved by gating any set false or change-over inputs to the flip-flop with the output of gate 49. Once the output of gate 49 goes true, the state of flip-flop 46 can be allowed to change. If the horizon is to slope downwards from left to right (with a conventional TV scan), the flip-flop must be set false at the beginning of each line; for a slope upwards from left to right, it must be set true at the beginning of each line. This can be achieved, for example, by gating the sign of the increment $dx$ onto the flip-flop by the line sync pulses from the line sync generator 37. The sign of the increment $dx$ may, for example, be indicated by its most significant bit. Further, the flip-flop 46 must change state during each line scan when the comparator 45 produces an output pulse. Finally, to ensure that the area below the lower end of a horizon sloping down from left to right remains dark, the flip-flop must be kept false when the contents of the X register reach their negative maximum, over-riding the setting true which a negative increment $dx$ causes while the horizon is being scanned. This control of the flip-flop 46 can easily be achieved by conventional logic circuitry.

For a system wherein the TV mode uses two interlaced frames, two alternative forms of operation are possible. In one form, area shading is used on both frames, with the initial contents of the X register differing by half the increment $dx$ on successive frames, to take account of the relative shift between successive frames. In the other form, area shading is used on only one frame. If no other picture is being displayed in the TV mode, the spot can be slightly defocussed to remove the "lininess" which might otherwise result, and the second frame can be omitted entirely, leaving the time normally used for the second frame available for other purposes, e.g., for drawing more symbols in the DDA mode.

If a solid-state display device is used instead of a conventional CRT, the device including a matrix of individually energizable electro-optical elements, then the whole system will operate digitally. For this, the digital-to-analog converters 24 and 27 will be absent, and the line scan and frame scan waveform generators 37 and 38 will be counters producing multi-bit digital outputs instead of analog outputs. The deflection system of the CRT will be replaced by appropriate decoding circuits for selecting the desired element of the matrix. Also, the comparator 45 will be digital, producing an output pulse when the sign of the difference between its two inputs changes.

It will therefore be realized that the area shading produced as described above is achieved by using already existing circuits in very large part. The only additional circuits are the circuitry 14, i.e., a comparator and a flip-flop, and various additional gates and control circuits.

We claim:

1. A display system of the CRT type operable in a DDA mode in which line symbols are drawn by incrementing X and Y registers with increments $dx$ and $dy$, where $dx^2 + dy^2$ is a small constant, the registers controlling the spot position on the display screen; and also operable in a TV mode in which the spot scans the display screen with a repetitive raster, wherein the DDA circuits are controlled during system operation in the TV mode so that the $dy$ increment is made equal to the line spacing, and the X register is incremented in synchronism with the line scans and its output is compared with the line scan signals so as to control the brightness of the display.

2. A display system according to claim 1, wherein the DDA circuits comprise two main registers which normally act as the X and Y registers, each of which consists of a more significant half with count capability and a less significant half with accumulator capability, and two increment registers normally used to store the increments $dx$ and $dy$, respectively, coupled to the less significant halves of the respective main registers and of length equal to half the length of the main registers, and wherein the less significant halves of the main registers can be effectively connected together to form the X register and the two increment registers can be effectively connected together to store the increment $dx$ during system operation in the TV mode.

3. A display system according to claim 1, including an integer register for storing an integer which is decremented by unity on each line scan, the incrementing of the X register being inhibited until the contents of this register are zero.

4. A display system according to claim 2, wherein the more significant half of one of the main registers is used as the integer register.

5. A display system according to claim 2, wherein the initial contents of the X register can be set to a value between zero and the increment $dx$ at the beginning of system operation in the TV mode.

6. A display system according to claim 1, wherein the output of the X register and the line scan signals are compared by a comparator which produces an output pulse when the signals fed to it are equal, and a flip-flop is provided with is controlled from the comparator and controls the brightness of the spot on the display screen.

7. A display system according to claim 3, wherein the more significant half of one of the main registers is used as the integer register.

8. A display system of the CRT type operable in a DDA mode in which line symbols are drawn by incrementing X and Y registers with increments $dx$ and $dy$, where $dx^2 + dy^2$ is a small constant, the registers controlling the spot position on the display screen, and also operable in a TV mode in which the spot scans the display screen with a repetitive raster, wherein the DDA circuits are controlled during system operation in the TV mode so that the $dy$ increment is made equal to the line spacing, and the X register is incremented in synchronism with the line scans and its output is compared with the line scan signals to control the brightness of the display, the DDA circuits comprising two main registers which normally act as the X and Y registers, each of which consists of a more significant portion with count capability and a less significant portion with accumulator capability, and two increment registers normally used to store the increments $dx$ and $dy$ respectively, coupled to the less significant portions of the respective main registers and of length equal to a portion of the length of the main registers, and wherein the less significant portions of the main registers can be effectively connected together to form the X register and the two increment registers can be effectively connected together to store the increment $dx$ during system operation in the TV mode.

9. A display system according to claim 8 wherein said portions are halves.

* * * * *